United States Patent
Braun

(10) Patent No.: US 9,146,140 B2
(45) Date of Patent: Sep. 29, 2015

(54) DISPLAY DEVICE HAVING A STEPPER MOTOR AND A WATCHDOG TIMER

(75) Inventor: Christian Braun, Aschaffenburg (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/004,878

(22) PCT Filed: Mar. 12, 2012

(86) PCT No.: PCT/EP2012/054226
§ 371 (c)(1),
(2), (4) Date: Sep. 12, 2013

(87) PCT Pub. No.: WO2012/123393
PCT Pub. Date: Sep. 20, 2012

(65) Prior Publication Data
US 2014/0002272 A1  Jan. 2, 2014

(30) Foreign Application Priority Data

Mar. 14, 2011  (DE) .......................... 10 2011 013 833

(51) Int. Cl.
*G08B 5/24* (2006.01)
*G01D 13/22* (2006.01)
(Continued)

(52) U.S. Cl.
CPC ................. *G01D 13/22* (2013.01); *B60K 37/02* (2013.01); *G06F 11/0739* (2013.01); *G06F 11/0757* (2013.01); *G06F 11/0769* (2013.01); *H02P 8/34* (2013.01); *B60K 2350/35* (2013.01)

(58) Field of Classification Search
CPC .......... G01D 13/22; H02P 8/34; B60K 37/02; G06F 11/0739; G06F 11/0757; G06F 11/0769
USPC ............ 340/815.78, 691.4, 691.5, 691.7, 461
See application file for complete search history.

(56) References Cited

U.S. PATENT DOCUMENTS

| 4,263,647 A | 4/1981 | Merrell et al. |
| 5,136,516 A | 8/1992 | Twombly |

(Continued)

FOREIGN PATENT DOCUMENTS

| DE | 196 00 687 A1 | 7/1996 |
| DE | 199 83 709 T1 | 2/2002 |

(Continued)

OTHER PUBLICATIONS

"MB88F332—LSI Product Specifications"; Fujitsu Semiconductor Limited; Sep. 30, 2010; Edition 1.2; 735 Pages; XP-055025355; URL:http://www.rlocman.ru/i/File/dat/Fujitsu/Microprocessors_MPU/MB88F332CAPMC_GSE2.pdf—(founded: Apr. 23, 2012) (Introduction of Specification).

(Continued)

*Primary Examiner* — Thomas Mullen
(74) *Attorney, Agent, or Firm* — Cozen O'Connor

(57) ABSTRACT

A display device, having a microcontroller, a graphics controller, and a pointer driven by a stepper motor. The graphics controller does not have an arithmetic logic unit and can be controlled by the microcontroller and by command sequences of a command sequencer contained in the graphics controller. The graphics controller has a stepper motor controller and the command sequencer has a watchdog timer. The watchdog timer is designed to monitor a connection signal between the microcontroller and the graphics controller and to start a first command sequence if the connection signal is overdue. The first command sequence is designed to use an internal cyclical signal to repeatedly start a second command sequence designed to move the stepper motor one step in the direction of a stop or a home position by the stepper motor controller.

9 Claims, 2 Drawing Sheets

(51) Int. Cl.
*G06F 11/07* (2006.01)
*B60K 37/02* (2006.01)
*H02P 8/34* (2006.01)

(56) References Cited

U.S. PATENT DOCUMENTS

| | | |
|---|---|---|
| 5,233,654 A | 8/1993 | Harvey et al. |
| 6,173,340 B1 | 1/2001 | Gready et al. |
| 2003/0074490 A1 | 4/2003 | Pochmuller |
| 2004/0128563 A1 | 7/2004 | Kaushik et al. |

FOREIGN PATENT DOCUMENTS

| | | |
|---|---|---|
| DE | 697 19 420 T2 | 8/2003 |
| DE | 100 22 479 B4 | 4/2004 |
| DE | 10 2004 011 701 A1 | 9/2005 |
| DE | 10 2005 023 818 A1 | 11/2006 |
| DE | 102 52 124 B4 | 11/2006 |
| DE | 10 2005 011 756 A1 | 4/2007 |
| DE | 103 93 969 T5 | 6/2008 |
| DE | 10 2007 022 646 B4 | 11/2009 |
| EP | 0 382 764 B1 | 4/1997 |
| JP | 59-079116 A | 5/1984 |

OTHER PUBLICATIONS

"Fujitsu and Inova Help Automakers and Tier-One Suppliers Design and Manufacture High-Performance Graphics Display Systems"; Fujitsu Microelectronics America, Inc.; Case Study MB88F332; Jan. 1, 2010; 7 pages; XP-055025360; URL:http://www.fujitsu.com/downloads/MICRO/fme/displaycontrollers/case-study-inova.pdf—(founded: Apr. 23, 2012).

DISPLAY DEVICE HAVING A STEPPER MOTOR AND A WATCHDOG TIMER

CROSS REFERENCE TO RELATED APPLICATIONS

This is a U.S. national stage of application No. PCT/EP2012/054226, filed on Mar. 12, 2012. Priority is claimed on German Application No. DE102011013833.1 filed Mar. 14, 2011, the content of which is incorporated herein by reference.

BACKGROUND OF THE INVENTION

1. Field of the Invention

The invention relates to a display device having a microcontroller, a graphics controller, and a pointer driven by means of a stepper motor. The graphics controller does not have an arithmetic logic unit and can be controlled by the microcontroller and by command sequences of a command sequencer contained in the graphics controller. In this arrangement, the graphics controller contains one or more stepper motor controllers and the command sequencer contains a watchdog timer.

2. Description of the Related Art

Special graphics controllers are used especially in displays in motor vehicles for reducing the workload of the microcontrollers and, nevertheless, being able to control complex, displays. In this context, the microcontroller controls the graphics controller that drive one or more electrooptical displays and one or more pointer instruments driven via a stepper motor. Such a graphics controller is known, for example, as the graphics controller MB88F332 by the company Fujitsu.

When the microcontroller and the graphics controller, due to a special construction of the display device, are not arranged on a common circuit board but on different circuit boards, the physical and logical connection of the microcontroller and the graphics controller is monitored. In the case of a fault, a user of the display device is provided with a clear indication that the display device exhibits a fault. In the case of a combined instrument of a motor vehicle, for example, this is intended to occur due to the fact that the pointers of an existing tachometer and a speedometer are moved into a home position, for example a zero position, so that a corresponding user of the display device is clearly presented with the fault case. The aforementioned graphics controller does not contain an arithmetic logic unit to move the existing pointer instrument into a home position in the case of a fault.

SUMMARY OF THE INVENTION

It is an object of one embodiment of the invention to specify a simple solution how the pointer instruments can be moved into a home position or against a stop in the case of a connection fault between the microcontroller and the graphics controller.

A watchdog timer is designed to monitor a connection signal between the microcontroller and the graphics controller and start a first command sequence when the connection signal is lacking. The first command sequence is designed to activate an internal cyclic signal to repeatedly start a second command sequence. The second command sequence is designed to move the stepper motor by one step in the direction of a stop or of a home position via the stepper motor controller. As a result, when a fault is detected in the connection between microcontroller and graphics controller, the first command sequence repeatedly starts the second command sequence and is thus moved by the stepper motor with each individual execution of the second command sequence by one step in the direction of a stop or of a home position.

To be sure that the pointer or pointers have been moved into a home position or to a stop, it would be possible, on the one hand, to monitor the position of the pointers and to adjust the drive accordingly when the position is reached. This availability of the home position can be implemented much more simply if the first command sequence can be executed until the pointer has reached the stop or the home position from any possible position. In this arrangement, the stepper motors are thus driven for as long as they are needed to pass from an end position to a home position. The distance of the pointers to be travelled indicates how many steps have to be travelled by the stepper motor in the direction of the home position or of the stop. If in the case of a fault, the pointer is not at an end position, for example, but at a center position, it will be moved in the direction of the stop or of the home position. After reaching the stop, it cannot then move further even if it is still driven. By driving the stepper motor for the maximum time required, the pointer is located at the home position without having to perform a separate check of its position.

An HSYNC signal is usually used to synchronize the individual image lines of an image to be represented in a display. Using this signal for command sequences is normally not permitted because it would make the loading on the microcontroller too high and result in a disturbance of the microcontroller. However, this overloading cannot occur if the connection between the graphics controller and the microcontroller is disturbed and thus cannot overload the microcontroller. By using the HSYNC signal as a cyclic signal, a signal is achieved, the cycle of which is well suited for executing a step of the stepper motor within the period of one cycle without having unnecessarily long waiting times. As a result, the pointers are brought speedily into the home position in the case of a fault.

Due to the fact that the first and/or second command sequence are stored in an internal flash memory of the graphics controller, immediate processing of the command sequence is possible without first having to store it in the graphics controller. If the first and/or second command sequence can be generated and stored in an internal RAM, the command sequence can be made much larger overall since the internal RAM of a graphics controller is in most cases designed to be much larger than the internal flash memory.

If the microcontroller and the graphics controller are connected via an automotive pixel link (APIX) communication interface, simple communication between the microcontroller and the graphics controller is possible.

BRIEF DESCRIPTION OF THE DRAWINGS

In the text which follows, the invention will be described by means of the figures following, in which.

DETAILED DESCRIPTION OF THE PRESENTLY PREFERRED EMBODIMENTS

Figure 1:
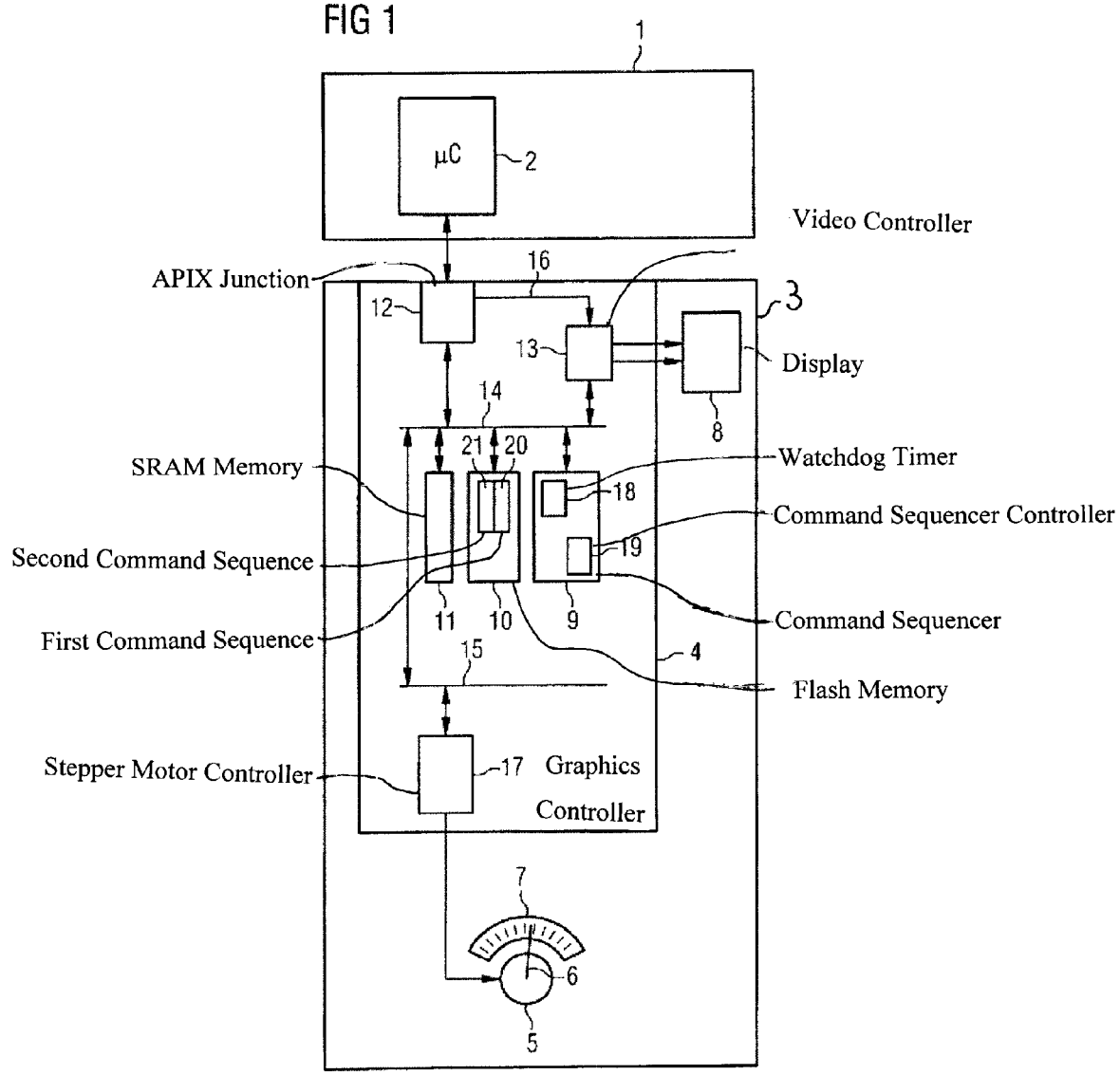
FIG. 1 is a block diagram of a display device according to the invention.

FIG. 1 is a first circuit board 1 comprising a microcontroller 2 and a second circuit board 3 comprising a graphics controller 4, a stepper motor 5, a pointer 6, a part of a dial plate 7 and a display 8. The graphics controller 4 contains a command sequencer 9, a flash memory 10, an SRAM memory 11, an APIX junction 12, a video controller 13, a first databus 14, a second databus 15, a so-called pixel link 16 and a stepper motor controller 17. The command sequencer 9 contains a watchdog timer 18 and a command sequencer controller 19. The flash memory 10 contains a first command sequence 20 and a second command sequence 21. The first and second command sequences 20, 21 are understood to be command lists which can only be processed sequentially and cannot contain any logic operation. Thus, no algorithm can be implemented as in a conventional microcontroller 2.

In normal operation, the microcontroller 2 drives the video controller 13 via the APIX interface 12 and the pixel link 16, and the video controller drives the display 8. Between the video controller 13 and the display 8, RGB information and time functions such as, for example, the horizontal synchronization HSYNC and the vertical synchronization VSYNC of the image to be presented are transmitted.

The microcontroller 2 also drives, via the APIX interface 12, the stepper motor controller 17 that drives the stepper motor 5 and hence determines a position of the pointer 6 on the dial plate 7. The watchdog timer 18 monitors the logical and physical connection of the microcontroller 2 and the APIX interface 12. As soon as watchdog timer 18 finds a break in the connection, the command sequencer 9 starts the first command sequence 20 in the flash memory 10. This first command sequence activates the internal HSYNC signal of the graphics controller 4, which is used as trigger source for the second command sequence 21. The second command sequence 21 contains in each case one stepper motor step for the stepper motor 5, and as a result of which, one stepper motor step is executed in each case in the cycle of the HSYNC signal. The second command sequence 21 is performed for a particular period of time, for example 3.2 seconds, which is sufficient for moving the stepper motor 5, and thus the pointer 6, back into the home position from any arbitrary position. After this period of time has elapsed, the activated HSYNC signal is deactivated again and, as a result, the second command sequence 21 is switched off so that the pointer 6 remains in its home position.

Figure 2:
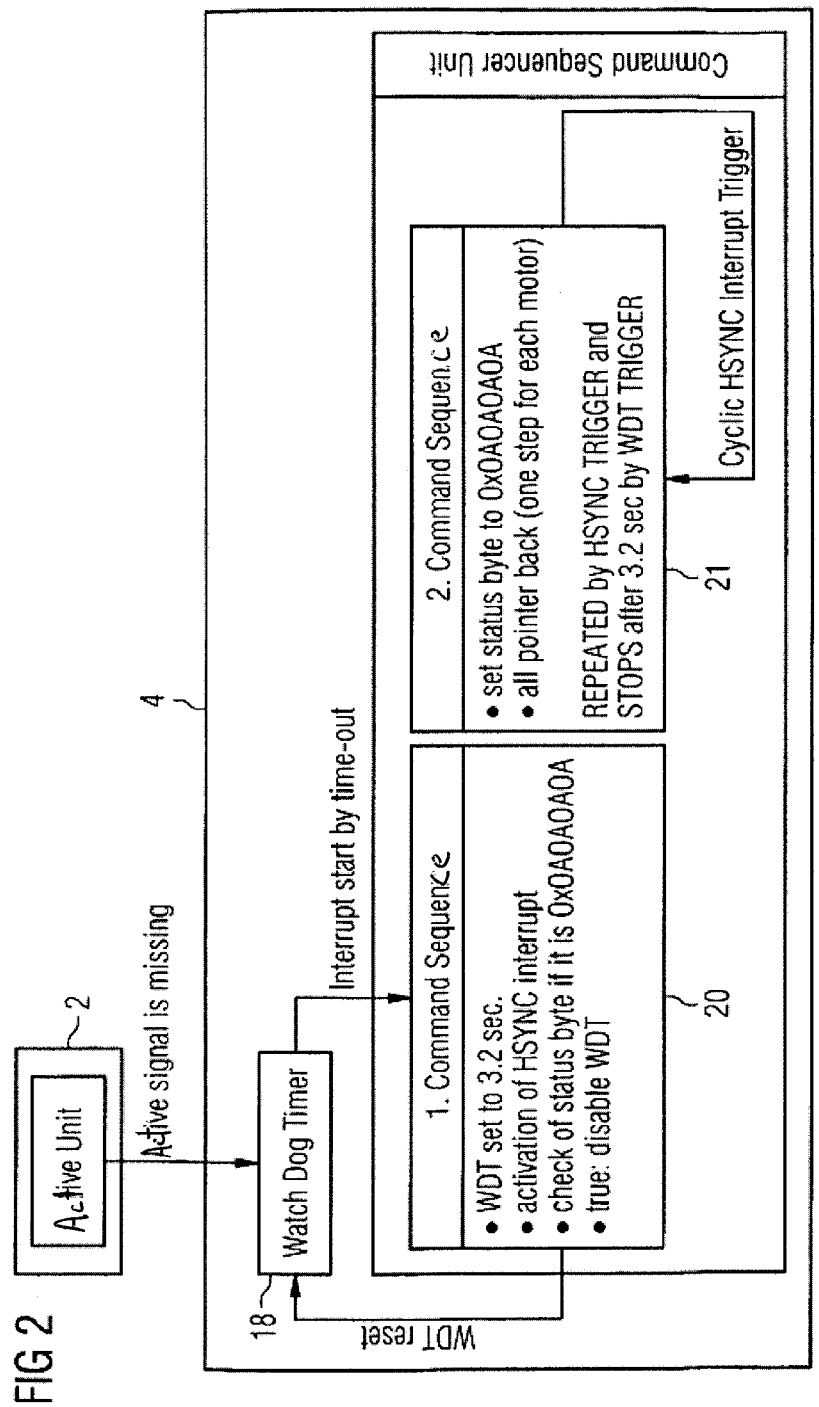
FIG. 2 is a flow chart comprising the steps executed by the display device according to FIG. 1.

In FIG. 2, the watchdog timer 18 monitors the active signal of the microcontroller 2. If it detects a lack of the active signal, it starts the first command sequence 20. This sets the watchdog timer 18 to 3.2 seconds and activates the HSYNC signal. Furthermore, it is checked whether the status byte has a particular value, here, for example, 0x0A0A0A. Since the first command sequence 20 has a higher priority than the second command sequence 21, this status byte is not yet set to the particular value, which is why the first command sequence 20 is ended. The HSYNC signal can now start the second command sequence 21 cyclically and set the status byte to the value 0x0A0A0A0A with each pass and move the pointer 6 back in the direction of the home position by one step of the stepper motor 5. After 3.2 seconds, the watchdog timer 18 (since it is set to this time) outputs a new interrupt start signal to the first command sequence 20. For this reason, the first command sequence 20 starts whilst, at the same time, the second command sequence 21 is stopped because of its lower priority. The stepper motor 5 is thus not moved further.

In the first command sequence 20, the watchdog timer 18 is set to 3.2 seconds and the HSYNC signal is switched on again (these settings do not have any effect on the further operation). The status byte is then checked: since it was previously set to the corresponding value by the second command sequence 21, the required condition is true so that the watchdog timer 18 and the HSYNC signal are turned off. Since, as a result, both the first sequence 20 and the second sequence 21 are no longer triggered, they remain inactive.

The operation of the present invention has been represented by a single stepper motor. Naturally, a number of stepper motors can also be driven via one or more stepper motor controllers 17 so that a number of pointers 6 can also be moved into a home position in the case of the presence of a fault of the signal transmission.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A display device comprising:
   a microcontroller;
   a graphics controller without an arithmetic logic unit comprising:
      a stepper motor controller; and
      a command sequencer having a watchdog timer, the watchdog timer configured to monitor a connection signal between the microcontroller and the graphics controller and start a first command sequence when the connection signal is lacking,
      wherein the graphics controller is configured to be controlled by the microcontroller and by command sequences of the command sequencer;
   a stepper motor; and
   a pointer driven by the stepper motor,
   wherein the first command sequence is configured to activate an internal cyclic signal to repeatedly start a second command sequence, and
   wherein the second command sequence is configured to move the stepper motor by one step in a direction of a stop or of a home position via the stepper motor controller.

2. The display device as claimed in claim 1, wherein the second command sequence is executed until the pointer has reached the stop or the home position from any possible position.

3. The display device as claimed in claim 1, wherein the first command sequence has a higher priority than the second command sequence.

4. The display device as claimed in claim 3, wherein the first command sequence turns the watchdog timer off after a period of time needed to move the pointer back to the stop or the home position .

5. The display device as claimed claim 1, wherein an HSYNC signal is used as the internal cyclic signal.

6. The display device as claimed in claim 1, further comprising an internal flash memory of the graphics controller configured to store at least one of the first command sequence and the second command sequence.

7. The display device as claimed in claim 1, further comprising an internal RAM of the graphics controller configured to store at least one of the first command sequence and the second command sequence,
 wherein the graphics controller is configured to generate at least one of the first command sequence and the second command sequence.

8. The display device as claimed in claim 1, further comprising an automotive pixel link (APIX) communication interface configured to connect the microcontroller and the graphics controller.

9. The display device as claimed in claim 1, wherein the microcontroller is configured to check a value of a status byte.

\* \* \* \* \*